US00RE33962E

United States Patent [19]

Sato et al.

[11] E Patent Number: Re. 33,962

[45] Reissued Date of Patent: Jun. 16, 1992

[54] BEARING DEVICE ASSEMBLY

[75] Inventors: Isao Sato, Sagamihara; Nobuhiko Miyake, Yokohama; Souji Nishida, Fujisawa, all of Japan

[73] Assignee: Nippon Seiko Kabushiki Kaisha, Tokyo, Japan

[21] Appl. No.: 561,729

[22] Filed: Aug. 1, 1990

Related U.S. Patent Documents

Reissue of:

[64] Patent No.: 4,874,259
Issued: Oct. 17, 1989
Appl. No.: 144,319
Filed: Jun. 14, 1988

[30] Foreign Application Priority Data

Jan. 19, 1987 [JP] Japan ..... 62-5763

[51] Int. Cl.[5] ..... F16C 43/04

[52] U.S. Cl. ..... 384/445; 384/537; 384/624; 403/11; 403/34

[58] Field of Search ..... 384/490, 537, 548, 559, 384/584, 585, 627; 403/11, 34

[56] References Cited

U.S. PATENT DOCUMENTS 3,979,804 9/1976 McCormick ..... 403/34

FOREIGN PATENT DOCUMENTS 29816 2/1982 Japan ..... 403/34
207527 12/1983 Japan .
128929 8/1984 Japan .
640638 7/1950 United Kingdom ..... 384/584

*Primary Examiner*—Thomas R. Hannon
*Attorney, Agent, or Firm*—Basile and Hanlon

[57] ABSTRACT

A bearing device assembly includes a water pump shaft supported by a rolling bearing, and a [plulley] *pulley* seat press fitted to one end of the water pump shaft. A recess or recesses in the form of a ring-shaped groove, a spiral-shaped groove, and a groove extending in the axial direction of the shaft, or the like are formed in at least one of the peripheral surface of the one end portion of the water pump shaft and the inner surface of the pulley seat. The recess prevents formation of an oil film on the fitting surface between the water pump shaft and the pulley seat at the time of press fitting the pulley seat, and also allows the remaining oil on the fitting surface to flow into the recess.

13 Claims, 5 Drawing Sheets

BEARING DEVICE ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a bearing device assembly, and, in particular, to an improved bearing device assembly wherein the fixing force of a rotary member mounting seat which is press fitted onto a shaft member of the bearing device assembly is enhanced.

2. Description of the Relevant Art

Prior art bearing device assemblies are those in which a rotary member mounting seat is press fitted onto one axial end of a shaft member having a rolling bearing assembled thereto. [an] *An* example of this type of bearing device assembly is a cooling water pump shaft of a water-cooled engine.

FIG. 1 shows an assembled water pump shaft comprising a rolling bearing 10 having an outer ring 11, mounted on an intermediate portion of a water pump shaft 12. The bearing 10 is fitted in a housing 31 of a water pump 30. The bearing may be of the ball or roller type. The water pump shaft 12 rotates and serves [and] *as* the inner bearing ring.

A vane 32 is secured to one axial end 13 of the water pump shaft 12, and a pulley seat 20, for mounting a rotary member, is press fitted to the other axial end 14 of the water pump shaft 12. A driving pulley 40, which is the rotary member, and a cooling fan 42 are secured by bolts 43 to the pulley seat 20. By driving the driving pulley 40 through a belt 44, the vane 32 and the cooling fan 42 are rotated as a unit, using the water pump shaft 12 as a common shaft.

The pulley seat 20 is press fitted to the one axial end 14 of the water pump shaft 12 with an interference clearance of minus 30–70 micrometers. However, in order to fit the pulley seat 20 in proper alignment with the center of wthe ater pump shaft 12, it is necessary to insure a high fitting accuracy. Therefore, the surface of the one axial end 14 of the water pump shaft 12 is highly finished with the chamfering or bevelling angle and the shape of the end face of the end 14 configured so that the smooth fitting can be achieved. Also, it is necessary to prevent drag from being caused on the fitting surface.

The fixing force of the pulley seat 20, which is press fitted to the water pump shaft 12, is affected by such conditions as the viscosity and the amount of rust resisting oil remaining on the fitting surface of the water pump shaft 12 or pulley seat 20, the roughness of the fitting surface, the chamfered shape of the end face of the water pump shaft at which the pulley seat is press fitted, and the speed at which press fitting occurs. For this reason, if these conditions are not appropriate, the fixing force of the pulley seat will be reduced to a great extent.

When the pulley seat fixing force between the pulley seat 20 and the pump shaft 12 is reduced, the pulley seat will move in the axial direction, or slip off of the water pump shaft causing damage to the cooling fan, or a radiator attached to the front side of the cooling fan.

The inventors of the present application found that the main cause of the reduced fixing force between the pulley seat 20 and the pump shaft 12, which results in displacement of the pulley seat 20 along the water pump shaft 12 or the slipping off of the pulley seat 20, is due to the formation of an oil film 52, as shown in FIG. 2, on the fitting surfaces of the pulley seat 20 and water pump shaft 12. Consequently, a boundary friction condition is caused wherein the frictional coefficient of the fitting surface is decreased. In this case, the aforementioned oil film 52 is formed when a rust resisting oil 50 which has been coated on the outer surface of the end portion 14 of the water pump shaft 12 remains on the fitting surface at the time of force fitting the pulley seat 20.

SUMMARY OF THE INVENTION

It is an object of the present invention to provide a bearing device assembly having a mechanism which enables press fitting of a rotary member mounting seat to a shaft member without allowing a rust resisting oil to remain on the fitting surface of one end of the shaft member and the rotary member mounting seat.

A bearing device assembly in accordance with the present invention is provided with recesses in at least one of the outer surface of one axial end of a shaft member on which surface a rust resisting oil remains or the inner surface of a rotary member mounting seat which is fixed by press fitting to the one axial end of the shaft member, or both. Owing to these recesses, when the rotary member mounting seat is press fitted to the one axial end of the shaft member, an oil film is interrupted by *the shoulder means of* the recesses when the end face of the rotary member mounting seat or the end face of the shaft member passes across a recess. Moreover, once the rotary member mounting seat is press fitted past the edges of a recess, the subsequent formation of an oil film is made difficult, and any rust resisting oil remaining on the fitting surface flows into the recess and is stored therein.

In the bearing device assembly of the present invention, since recesses are provided in at least one of the fixing surfaces of the axial end portion of the shaft member on which surface a rust resisting oil is remaining or the inner surface of the rotary member mounting seat, the formation of the oil film on the fitting surface is hindered, and at the same time, the rust resisting oil remaining on the fitting surface is allowed to flow into the recess *due to the difference between the surface pressure of the oil at the position of the recess and at other positions along the fitting surface of the shaft member or the rotary member mounting seat.* As a result, the formation of the oil film of rust resisting oil on the fitting surface is substantially decreased and the rotary member mounting seat, which is force fitted, is secured with an increased fixing force. Moreover, the securing force on the fitting surface between the shaft member and the rotary member mounting seat is enhanced with the lapse of time after press fitting, as any remaining oil flows into the recesses. Accordingly, in the present invention, it is possible to prevent an accident in which the rotary member mounting seat moves in the axial direction or slips off of the shaft member during rotation of the shaft member. Thus, a bearing device assembly having stable and reliable properties can be obtained.

Other objects and features of the invention will become apparent by reference to the following specification and to the drawings.

DESCRIPTION OF THE PREFERRED EMBODIMENTS

The embodiments of the present invention applied to a bearing device assembly for a water pump will be described with reference to the drawings.

Figure 1:
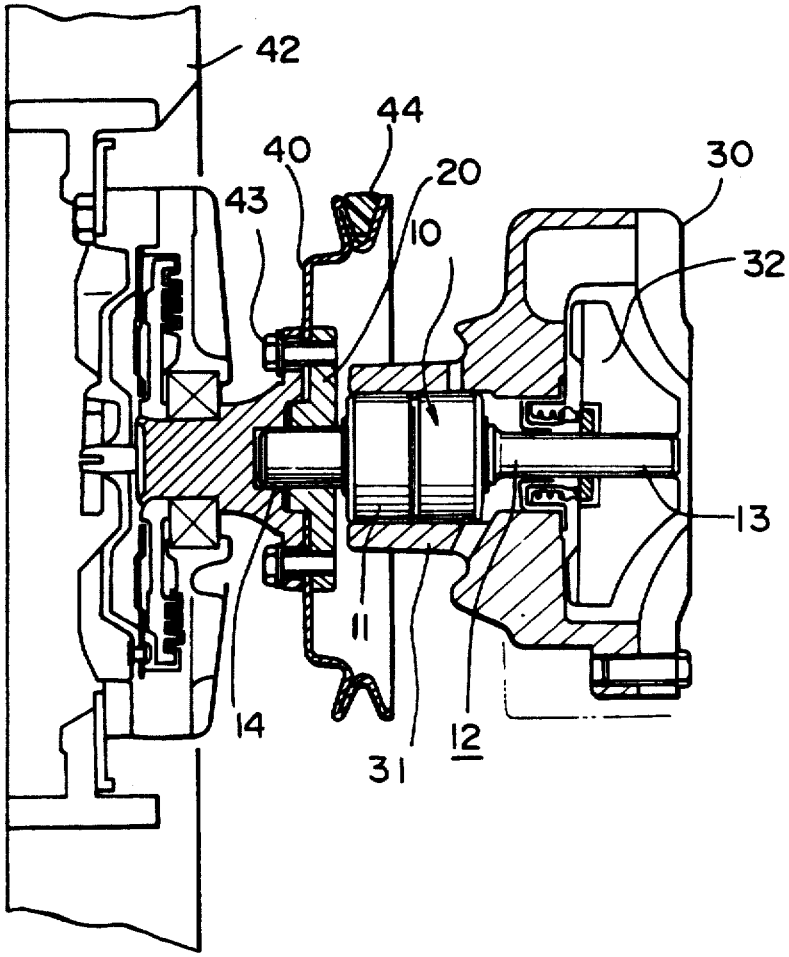
FIG. 1 (PRIOR ART)
FIG. 1 is a sectional view of a prior art assembly showing a shaft member and a pulley seat of an automobile engine cooling water pump.
Figure 2:
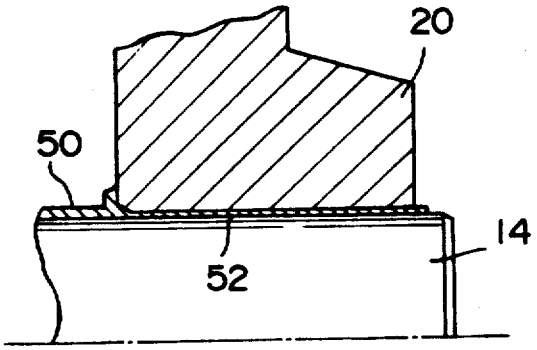
FIG. 2 (PRIOR ART)
FIG. 2 is an enlarged sectional view showing the condition of the prior art water pump shaft and pulley seat following press fitting.
Figure 3:
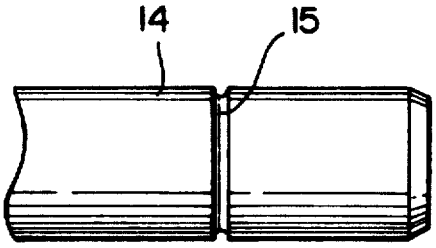
FIG. 3 is a side view of one axial end portion of a water pump shaft member in accordance with an embodiment of the present invention.

FIG. 3 shows an axial end portion 14 of a water pump shaft on which a pulley is force fitted, having a recess or groove 15, having a semi-circular cross section, formed continuously around the peripheral surface of the axial end portion 14 to form a ring shape.

Figure 4:
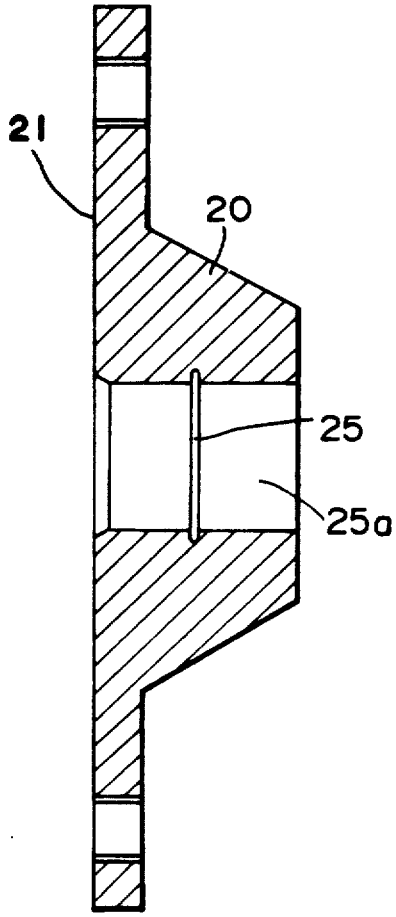
FIG. 4 is a longitudinal sectional view of a rotary member mounting seat of the present invention.

FIG. 4 shows a pulley seat 20 in the present invention, with a recess or groove 25, having a semi-circular cross section, formed continuously and circumferentially around an inner surface of a cylindrical through hole 25a, in pulley seat 20, in which the axial end portion 14 is fitted. Either one or both of the recess or groove 15 of the axial end portion 14 of the water pump shaft or the recess or groove 25 of the pulley seat 20 may be provided.

Figure 5:
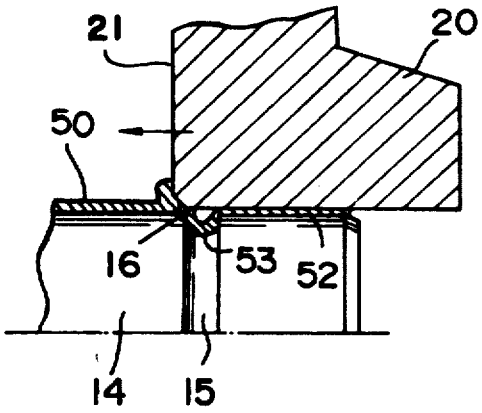
FIGS. 5 and 6 are enlarged sectional views of an upper half portion of a water pump shaft and pulley seat of the present invention, showing a change in an oil film on the fitting surface during force fitting and after the force fitting, respectively.
Figure 6:
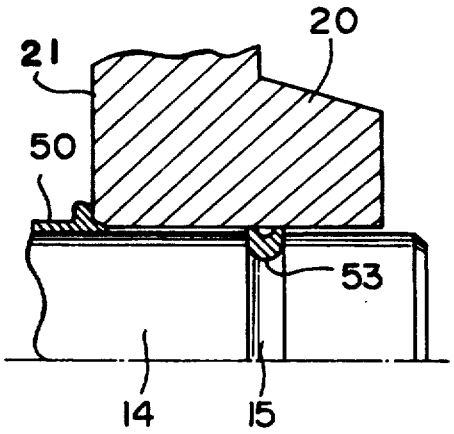

FIGS. 5 and 6 are enlarged sectional views of an upper half portion of the one axial end portion 14 and the pulley seat 20 for illustrating a change in condition of an oil film during press fitting of the pulley seat 20, and after the press fitting of the pulley seat 20, respectively.

In FIG. 5, when the pulley seat 20 is press fitted to the one axial end 14 of the water pump shaft in the direction of the arrow, and until the front face 21 of the pulley seat 20 reaches the recess 15 of the one axial end 14 of the water pump shaft, most of a [rest] *rust* resisting oil 50 coated on the outer surface of the one axial end portion 14 is scraped down, leaving only a part of the rust resisting oil 50 to remain on the fitting surface to form an oil film 52. However, when the front face of the pulley seat 20 passes over recess 15, the oil film 52 is cut and separated between the inner surface 21 of the pulley seat 20 and the recess 15. Specifically, when the front face of the pulley seat 20 passes over an inside edge or shoulder 16 of the recess 15, the connection of the oil film 52 with remaining rust resisting oil 53 in the recess 15 is cut. As the press fitting of the pulley seat 20 is continued, as shown in FIG. 6, the rust resisting oil 50 on the one axial end 14 of the water pump shaft is scraped off by the front face of the pulley seat 20 in the direction of press fitting and pushed forwardly. As a result, substantially no oil film is formed on the fitting surface at an axially inside portion thereof with respect to the recess 15.

Furthermore, the oil film 52 formed on the fitting surface at a position axially outside of the recess 15 of the one axial end 14, at the beginning of the press fitting of the pulley seat 20, is gradually pulled towards the remaining rust resisting oil 53 in the recess 15. At this position, the surface pressure is low due to a surface pressure difference between the inner surface of the pulley seat 20 and the peripheral surface of the one axial end portion 14 of the water pump. Thus, the oil film 52 flows into the recess 15 and is stored therein. Additionally, the oil film formed on the fitting surface at a position axially inside of the recess 15 of the one axial end portion 14 of the water pump, similarly due to the surface pressure difference, flows into the recess 15, leaving no rust resisting oil remaining on the fitting surface, excepting the recess 15.

Also, in cases in which the recess 25 is formed in the pulley seat 20, or both the recess 15 of the one axial end 14 of the water pump shaft and the recess 25 of the pulley seat are provided, it is possible to prevent the formation of the oil film on the fitting surface by entirely similar action as described above.

FIGS. 7 to 13 show additional embodiments of the present invention.

Figure 7:
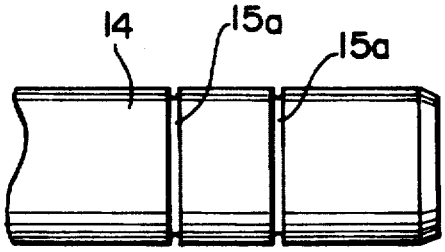
FIGS. 7 to 9 are side views of one axial end portion of a shaft member, respectively, according to other embodiments of the present invention.

In the embodiment of FIG. 7, two continuous recesses or grooves, in the form of two rings 15a, are provided in the peripheral surface of the one axial end portion 14 of the water pump shaft. The grooves 15a are spaced from each other by a suitable distance. Each of the recesses 15a has a shape similar to the recess 15 in FIG. 3.

Figure 8:
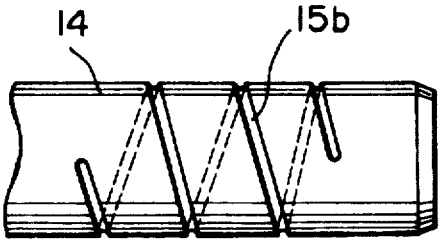

In the embodiment of FIG. 8, a recess or groove 15b is formed in a spiral shape in the peripheral surface of one axial end portion 14 of the water pump shaft.

Figure 9:
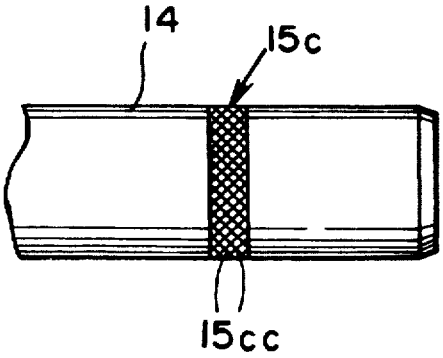

In the embodiment of FIG. 9, a recess 15c, having a plurality of parallel narrow channels 15cc intersecting one another to form a mesh shape, is provided in the peripheral surface of one axial end portion 14 of the water pump shaft. The recess 15c is continuous around the peripheral surface of the one axial end portion 14 to form a circular band and extends in the axial direction to a suitable width.

Figure 10A:
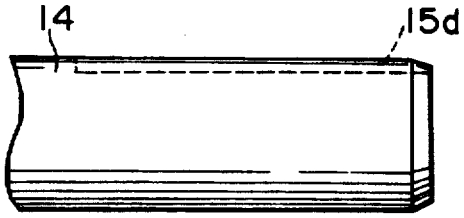
FIGS. 10(A-B) to 13(A-B) show respective side views and front views of one axial end portion of a shaft member according to further embodiments of the present invention.
Figure 10B:
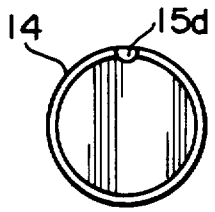

In the embodiment of FIGS. 10A and 10B, a recess or groove 15d having a semi-circular cross section is formed in the peripheral surface of one axial end portion 14 of the water pump shaft so that the recess 15d extends axially inwardly from the end face of the end portion 14.

Figure 11A:
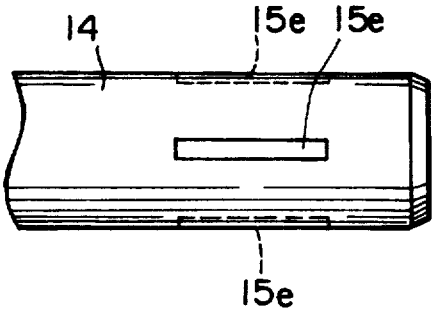
Figure 11B:
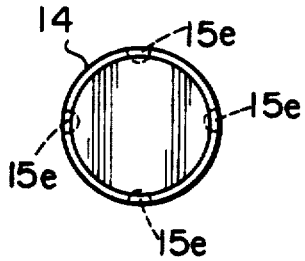

In the embodiment of FIGS. 11A and 11B, four recesses or grooves 15e having semi-circular cross-sections are formed in the peripheral surface of one axial end portion 14 of the water pump shaft. The four recesses 15e extend axially in a parallel relation to one another from the end face of the axial end portion 14 inwardly therefrom. The four recesses 15e are spaced at equal intervals along the circumference of the peripheral surface of the axial end portion 14.

Figure 12A:
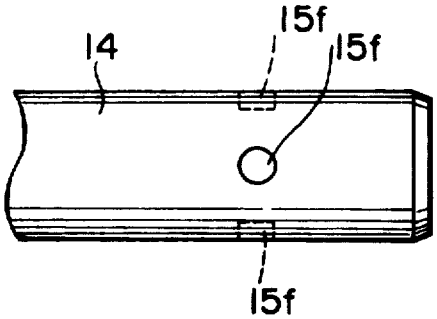
Figure 12B:
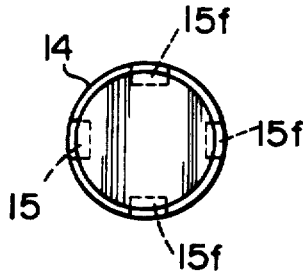

In the embodiment of FIGS. 12A and 12B, four circular recesses 15f are formed in the peripheral surface of one end portion 14 of the water pump shaft along the circumference of the peripheral surface in equally spaced intervals.

Figure 13A:
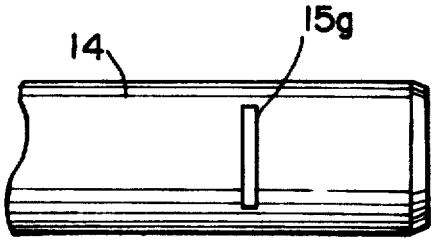
Figure 13B:
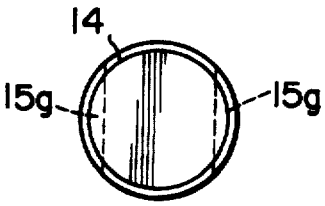

In the embodiment of FIGS. 13A and 13B, two slit-like recesses 15g are formed at both sides of a vertical center line (a center line in the cross section) which passes through the shaft center of the water pump shaft and intersects the center axial line by notching the peripheral surface of one end portion 14 of the water pump shaft.

The recesses or grooves in the embodiments of FIGS. 7 through 13 may also be provided in the inner surface of the pulley seat 20, or may be provided in both the peripheral surface of one end portion 14 of the water pump shaft and the inner surface of the pulley seat 20.

The cross sectional and plane shapes of the recesses or grooves in the above embodiments are not limited to the shapes shown in the FIGURES, but other arbitrary shapes such as a triangular shape, polygonal shape, elliptical shape, or other suitable shapes may be selected.

Figure 14:
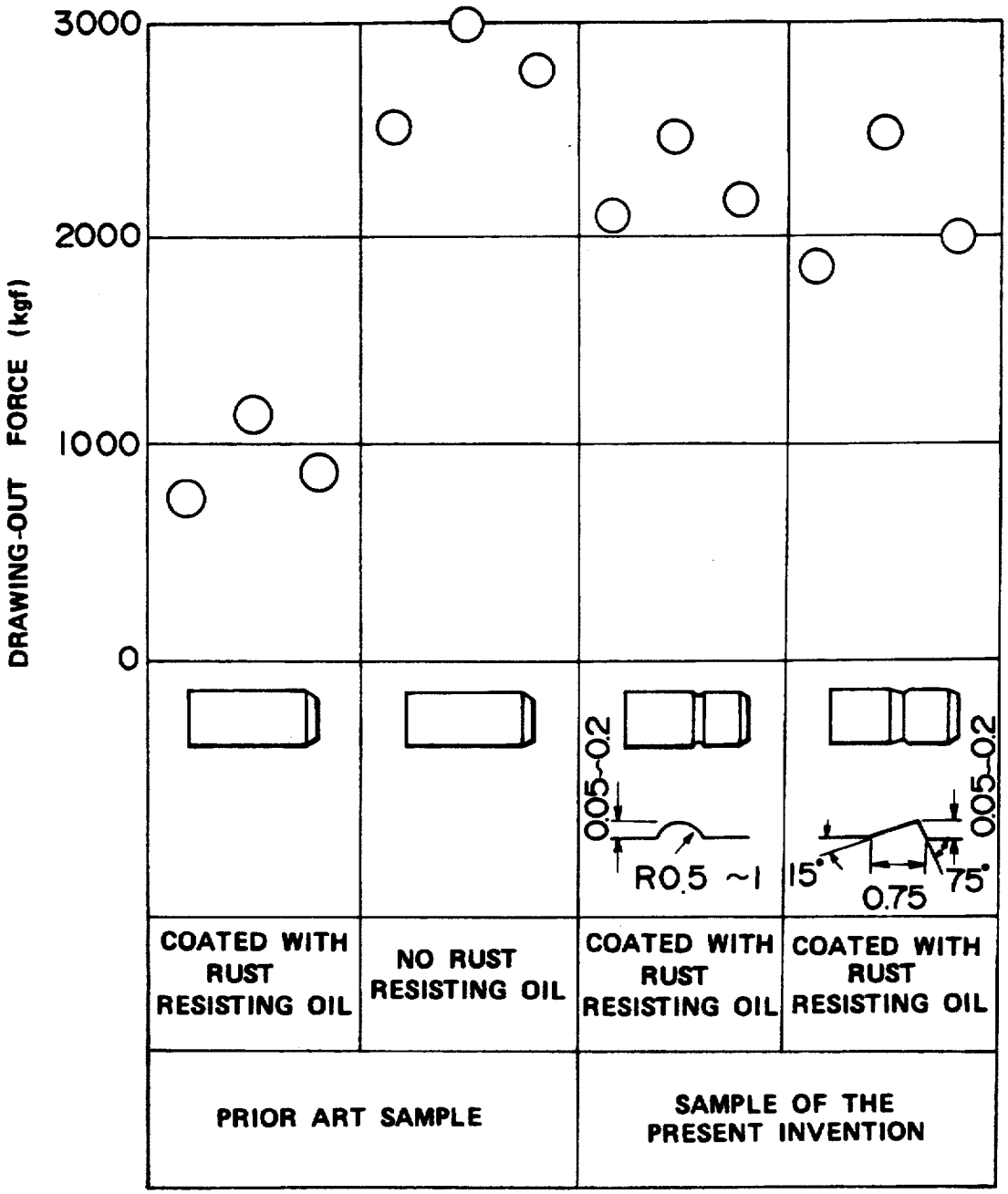
FIG. 14 is a chart showing test results of the drawing-out force for the rotary member mounting seat.

Next, the results of a test of the drawing-out force for a pulley seat, conducted as to samples of the bearing device assembly of the present invention, are shown in FIG. 14 in comparison with samples of the prior art.

The samples of the present invention used in the test include a sample having a shaft member formed with one recess or groove having a semicircular cross section and extending along the circumference, and the other sample having a shaft member formed with one recess or groove having a triangular cross section and extending along the circumference. Each sample of the present invention was coated with a rust resisting oil on the peripheral surface of the shaft member. The samples were left to stand for one week after which a pulley seat was press fitted at a speed of 1.5 mm/s.

The samples of the prior art used in the test include a sample having a pulley seat force fitted under the same condition as mentioned above, and another sample in which, after the rust resisting oil was coated on the peripheral surface of the shaft member, the rust resisting oil was removed when a pulley seat was force fitted.

For each of the samples, the roughness of the peripheral surface of the shaft member, the chamfering angle, the shape of the end portion of the shaft member to which the pulley seat is force fitted, and the kind of rust resisting oil were set the same as the prior art specification.

As shown in FIG. 14, the samples of the present invention require a higher drawing-out force than the samples of the prior art; the drawing-out force being comparable to that of the sample in which the rust resisting oil is removed.

The frictional coefficient was calculated using the test results. According to the calculations, the frictional coefficient of the samples of the present invention, and the samples having the rust resisting oil removed, was about 0.16 which is in a dry frictional region. In contrast to this, the frictional coefficient of the samples having the rust resisting oil coated thereon was about 0.06 which is in a boundary frictional region, showing that an oil film is formed on the fitting surface.

In the above embodiments, the bearing device assembly for the water pump is described. However, the present invention is not limited to the above embodiments but the present invention is also applicable to other bearing assemblies which are assembled by force fitting a rotary member mounting seat to one axial end portion of a shaft member.

While certain embodiments of the invention have been described in detail above in relation to a bearing device assembly, it will be apparent to those skilled in the art that the disclosed embodiment may be modified. Therefore, the foregoing description is to be considered exemplary rather than limiting, and the true scope of the invention is that defined in the following claims.

What is claimed is:

1. In a bearing device assembly including a shaft member supported by a rolling bearing at an intermediate position thereof, and a rotary member mounting seat press fitted to one axial end of said shaft member, said shaft member having a rust resisting oil attached thereto, the improvement comprising:

a [ring-shaped] recess formed in at least one of a peripheral surface of the one axial end of said shaft member [at one end thereof] and an inner surface of said rotary member mounting seat, shoulder means formed on said recess for scraping off the oil attached to [said one axial end of said shaft member] *a surface opposed to said shoulder means* by relative *sliding* movement [between the] *of said* shoulder means [of] *with respect to said surface opposed to said shoulder means,* said recess [and an end face of one of said shaft member and said rotary member mounting seat, and] *being* for [directing any remaining] *receiving said* oil [on the fitting surface into said recess after said shaft member has been fitted into said rotary member mounting seat].

2. A bearing device assembly according to claim 1 wherein said recess comprises a continuous groove extending circularly to form a ring shape.

3. A bearing device assembly according to claim 1 wherein said recess comprises a plurality of continuous grooves spaced from each other in an axial direction of said shaft member, each of said plurality of grooves extending circularly to form a ring shape.

4. A bearing device assembly according to claim 1 wherein said recess comprises a groove, extending in a spiral shape.

5. A bearing device assembly according to claim [1] *12* wherein said recess comprises a plurality of narrow channels which intersect one another to form a mesh shape.

6. A bearing device assembly according to claim [1] *13* wherein said recess comprises a groove extending in the axial direction of said shaft member from the end face of at least one of said shaft member and said rotary member mounting seat.

7. A bearing device assembly according to claim [1] *13* wherein said recess comprises a plurality of grooves of a predetermined length, spaced at equal intervals along a circular direction, and extending inwardly in the axial direction of said shaft member from an axially inside position with respect to the end face of at least one of said shaft member and said rotary member mounting seat.

8. A bearing device assembly according to claim 1] *13* wherein said recess comprises a plurality of recesses of a predetermined plane shape spaced at equal intervals in a circular direction.

9. A bearing device assembly according to claim [1] *12* wherein said recess comprises two parallel slit-like recesses located at both sides of a vertical center line which passes through the shaft center of said shaft member.

10. A bearing device assembly including a shaft member supporting by a rolling bearing and having a rust resisting oil coated and remaining on a surface thereof, and a rotary member mounting seat press fitted to one axial end of said shaft member, the improvement comprising:

a recess formed in a peripheral surface of the one axial end of said shaft member;

wherein said recess serves to prevent formation of an oil film on a fitting surface between said shaft member and said rotary member mounting seat at the time of press fitting said rotary member mounting seat onto said shaft member;

wherein said recess also serves to make the remaining oil on the fitting surface flow into said recess.

11. A bearing device assembly including a shaft member supported by a rolling bearing and having a rust resisting oil coated and remaining on a surface thereof, and a rotary member mounting seat press fitted to one axial end of said shaft member, the improvement comprising:

a recess formed in an inner surface of said rotary member mounting seat, wherein said recess serves to prevent formation of an oil film on a fitting surface between said shaft member and said rotary member mounting seat at the time of press fitting said rotary member mounting seat onto said shaft member, and wherein said recess also serves to make the remaining oil on the fitting surface flow into said recess.

*12. In a bearing device assembly including a shaft member supported by a rolling bearing at an intermediate position thereof, and a rotary member mounting seat press fitted to one axial end of said shaft member, said shaft member having a rust resisting oil attached thereto, the improvement comprising:*

*a recess formed on at least one of a peripheral surface of the one axial end of said shaft member and an inner surface of said rotary member mounting seat, shoulder means formed on said recess for scraping off the oil attached to a surface opposed to said shoulder means by relative sliding movement of said shoulder means with respect to said surface opposed to said shoulder means, said recess being for receiving said oil, said recess further for receiving any remaining oil on the fitting surface after said shaft member has been fitted into said rotary member mounting seat, due to the difference between the surface pressure of the oil at the position of said recess and at other positions along said fitting surface in the fitted state.*

*13. In a bearing device assembly including a shaft member supported by a rolling bearing at an intermediate position thereof, and a rotary member mounting seat press fitted to one axial end of said shaft member, said shaft member having a rust resisting oil attached thereto, the improvement comprising:*

*a recess formed on at least one of a peripheral surface of the one axial end of said shaft member and an inner surface of said rotary member mounting seat, shoulder means formed on said recess for scraping off the oil attached to a surface opposed to said shoulder means by relative sliding movement of said shoulder means with respect to said surface opposed to said shoulder means, said recess being for receiving any remaining oil on the fitting surface after said shaft member has been fitted into said rotary member mounting seat, due to the difference between the surface pressure of the oil at the position of said recess and at other positions along said fitting surface in the fitted state.*

* * * * *